US005623463A

United States Patent [19]
Kim

[11] Patent Number: 5,623,463
[45] Date of Patent: Apr. 22, 1997

[54] METHOD FOR DETERMINING A FOCUSING CONTROL OPERATION POSITION IN AN OPTO-MAGNETIC DISC RECORDING/REPRODUCING APPARATUS

[75] Inventor: See-Wean Kim, Seoul, Rep. of Korea

[73] Assignee: Daewoo Electronics Co., Ltd., Seoul, Rep. of Korea

[21] Appl. No.: 557,732

[22] Filed: Nov. 13, 1995

[30] Foreign Application Priority Data

Nov. 14, 1994 [KR] Rep. of Korea ............ 94-29779

[51] Int. Cl.$^6$ ............................................. G11B 7/00
[52] U.S. Cl. ................................................. 369/44.25
[58] Field of Search ...................... 369/44.25, 44.27, 369/44.28, 44.29, 124, 13

[56] References Cited

U.S. PATENT DOCUMENTS

| | | | |
|---|---|---|---|
| 4,700,056 | 10/1987 | Silvy et al. | 369/44.28 |
| 5,086,420 | 2/1992 | Doi | 369/44.25 |
| 5,414,682 | 5/1995 | Iida | 369/44.25 |
| 5,499,231 | 3/1996 | Fennema et al. | 369/124 |

*Primary Examiner*—Nabil Hindi
*Attorney, Agent, or Firm*—Beveridge, DeGrandi, Weilacher & Young LLP

[57] ABSTRACT

A method for determining a focusing control position in an opto-magnetic disc recording/reproducing apparatus, shortens the focusing time required for determining the focusing control position of an objective lens. When a focusing detecting signal and a focus zero crossing signal are received into a control section as many as the prescribed times while the objective lens ascends to perform an operation for determining the focusing control position, the ascending operation of the objective lens in not further carried out in the current position, but a descending operation is performed to execute the focusing control operation with respect to a reflective layer included in the opto-magnetic disc. The time required for determining the focusing control position is reduced to improve the degradation of a characteristic of a focusing coil caused by a frequent supply of focusing control current.

15 Claims, 5 Drawing Sheets

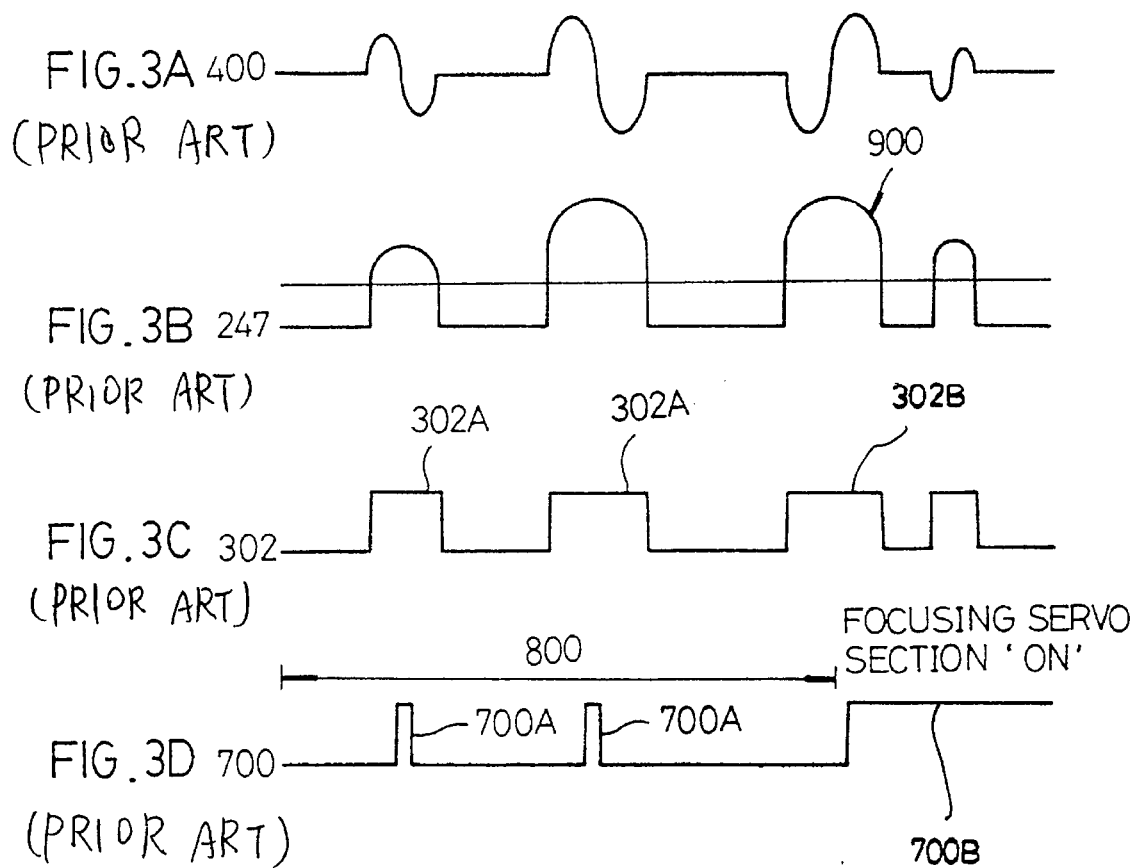

METHOD FOR DETERMINING A FOCUSING CONTROL OPERATION POSITION IN AN OPTO-MAGNETIC DISC RECORDING/REPRODUCING APPARATUS

BACKGROUND OF THE INVENTION

1. Field of the Invention

The present invention relates to a method for determining a focusing control operation position in an opto-magnetic disc recording/reproducing apparatus. More particularly, the present invention relates to a method for determining a focusing control operation position in an opto-magnetic disc recording/reproducing apparatus for shortening a focusing time required for determining a focusing control operation position of an objective lens and preventing deterioration of a focusing coil.

2. Description of the Prior Art

Currently, opto-magnetic discs have been developed to be used as one kind of optical discs to/from which information can be recorded and/or reproduced. The opto-magnetic disc is loaded to be used in a mini-disc player which is an opto-magnetic disc recording/reproducing apparatus. In the mini-disc player, since a small-sized mini disc, e.g., having a diameter of 64 [mm], is retentively loaded within a cartridge having dimensions of 68 mm×72 mm×5 mm, it is handy to carry the disc, and a user can use two types of recording media such as an optical disc exclusive to reproducing and the opto-magnetic disc to/from which information can be recorded and/or reproduced. In addition, the mini-disc player executes a random access function like a compact disc player and can execute 74-minute reproducing operation, by a data compression method, even when a small-sized disc is loaded therein as if a compact disc were loaded therein, thereby having been widespread.

FIG. 1 is a sectional view for showing a sectional structure of a general opto-magnetic disc. As shown in FIG. 1, an opto-magnetic disc 10 includes a transparent substrate 11 formed of a polycarbonate particularly among transparent synthetic resins such as a PVC, PMMA and polycarbonate so as to allow laser beam for reading out audio/video signals to pass therethrough. Transparent substrate 11 has an uneven structure which forms pits corresponding to predetermined optical signals. Accordingly, a reflective layer 12 is formed of a thin film made of metal, i.e., aluminum, having a large reflection factor in order to reflect the optical signal. Also, a protective layer 13 made of a hard synthetic resin is adhesively formed above reflective layer 12 in order to protect reflective layer 12. A first dielectric layer 14 is adhesively formed below reflective layer 12. A second dielectric layer 15 is adhesively formed above transparent substrate 11. A magnetic layer 16 is adhesively formed between first dielectric layer 14 and second dielectric layer 15.

FIG. 2A is a schematic view for illustrating a recording operation in a recording/reproducing apparatus for the opto-magnetic disc shown in FIG. 1. FIG. 2B is a waveform for representing characteristics of signal recording current applied to a magnetic head in order to record information on a recording surface of the opto-magnetic disc by means of the magnetic head shown in FIG. 2A. As shown in FIGS. 2A and 2B, a principle in which information is recorded on opto-magnetic disc 10 having the above-mentioned structure, is as follows. Laser beam is irradiated onto a lower outer surface of opto-magnetic disc 10 by using a laser apparatus (not shown) having an output power of approximately 4 [mW]. When a temperature at a portion (hereinafter referred to as "beam spot portion") 17 of the lower outer surface of opto-magnetic disc 10 to which the laser beam is applied, is increased to approximately 180° C., a head driving signal 281, i.e., signal recording current, begins flowing through a magnetic head coil 261, in accordance with a direction in which required information is recorded on opto-magnetic disc 10, included in a magnetic head 260 placed on an upper outer surface of opto-magnetic disc 10. At this time, a position of beam spot portion 17 is moved while opto-magnetic disc 10 is rotated, so that beam spot portion 17 is cooled and has a magnetism by means of polarity of magnetic head 260. Namely, while head driving signal 281 is supplied to magnetic head coil 261, a track surface of opto-magnetic disc 10 is polarized to N and S.

A principle in which information is reproduced from opto-magnetic disc 10, is as follows. Laser beam is irradiated onto the lower outer surface of opto-magnetic disc 10 by using a laser apparatus (not shown) having an output power of approximately 0.6 [mW]. In terms of the Kerr effect, in accordance with the N and S polarities of polarized opto-magnetic disc 10, the laser beam incident onto opto-magnetic disc 10 is reflected with the state that a polarizing plane thereof is rotated clockwise or counter-clockwise by approximately 0.2°–0.3° C., and passes through a polarizing beam splitter (not shown) to be incident to the set of two light receiving devices (not shown) which are installed with a predetermined gap between them. At this time, signals having antiphase are generated from the light receiving devices. Then, on the basis of the antiphase signal, the N pole and S pole of a magnetic material included in opto-magnetic disc 10 are respectively converted into voltage values of "high" and "low" levels in order to be recognized as data.

As described above, in order to accurately execute the operation in which data is read out from opto-magnetic disc 10, the laser beam should be accurately focused on reflective layer 12. Generally, the reflectance of protective layer 13 and refective layer 12 included in opto-magnetic disc 10 are not considerably different from each other in the opto-magnetic disc recording/reproducing apparatus. Therefore, a time (hereinafter. referred to as "set time of timer") required to focus at a desired position of protective layer 13 of opto-magnetic disc 10 as shown in FIG. 31), is sufficiently set, and amount of the focusing control current flowing through the focusing coil is increased, thereby upwardly moving objective lens 242 in order to execute the focusing control operation on reflective layer 12. After that, when set time of timer 800 is terminated, objective lens 242 (shown in FIG. 4) gradually moves downwards while the amount of the focusing control current is decreased, thereby executing the focusing operation on refective layer 12.

FIG. 3A is waveform for illustrating characteristics of a focusing error signal. FIG. 3B is a waveform for illustrating characteristics of a light receiving device output signal provided by a light receiving device. FIG. 3C is a waveform for illustrating characteristics of a focusing detecting signal. FIG. 3D is a waveform for illustrating characteristics of a focusing detecting signal. FIG. 3D is a waveform for illustrating characteristics of a focus zero crossing signal. FIG. 4 is a block diagram for showing a servo system of a recording/reproducing apparatus for the opto-magnetic disc shown in FIG. 1. Namely, if the magnitude of the focusing control current is increased at the begining of the focusing operation, i.e., during the set time of the timer, objective lens 242 moves upwards in order to execute a focus searching operation. Accordingly, as shown in FIGS. 3A to 4, an arbitrary focusing error signal 400 (shown in FIG. 3A) is detected by a focusing error detecting section (not shown) included in a focusing servo section 300. A light receiving device output signal 247 provided by a light receiving device 241 in order to detect focusing error signal 400, has the waveform as shown in FIG. 3B.

Focusing detecting signal 302 as shown FIG. 3C denotes a signal detected by focusing servo section 300 when receiving a first signal of quantity of light 500A corresponding to an inaccurate focusing on a device or a second signal of quantity of light 500B corresponding to an accurate focusing on a device. e.g., light receiving device 241 divided-by-four. A signal of quantity of light 500 denotes first signal of quantity of light 500A or second signal of quantity of light 500B. Focus zero crossing signal 700 shown in FIG. 3D is a signal detected by a focus zero crossing switch section (not shown), included in a focusing servo section 300, corresponding to "ON" state of a focusing servo section 300. When focusing detecting signal 302 is applied to a control section 140 (shown in FIG. 4), focus zero crossing signal 700 received within set time of timer 800 is disregarded in case that set time of timer 800 is not terminated.

Thereafter, in accordance with a continuous ascending operation of objective lens 242, when the laser beam deviates from reflective layer 12 included in opto-magnetic disc 10 to focus on protective layer 13 adhesively disposed above reflective layer 12 (namely, when set time of timer 800 is terminated), a value of a focusing control current signal 301 flowing through a focusing coil 243 is decreased under the control operation of control section 140, and a focusing position of objective lens 242 is lowered. As a result, when the laser beam is focused on reflective layer 12, light receiving device 241 receives second signal of quantity of light 500B corresponding to the accurate focusing. Consequently, control section 140 is supplied with both focusing detecting signal 302 provided by focusing servo section 300 and focus zero crossing signal 700 corresponding to "ON" state of focusing servo section 300. Then, under the control operation of control section 140, the focusing operation is continuously carried out from the point when focus zero crossing signal 700 is generated.

As described above, for determining a desired focusing position in the conventional opto-magnetic disc recording/reproducing apparatus, the laser beam is primarily focused on a predetermined position of protective layer 12 included in opto-magnetic disc 10. Then, the focusing position of objective lens 242 is gradually lowered until reaching reflective layer 12, and the focusing is in "ON" state at this position. Therefore, in the aforementioned method for determining the focusing control operation position, it takes unnecessarily much time, and the laser beam should be focused onto the predetermined position of protective layer 13 included in opto-magnetic disc 10, causing excess current to flow through the focusing coil. Furthermore, as the focusing control current is frequently applied to the focusing coil, the characteristics of the focusing coil are deteriorated, so that the accurate focusing control operation is hard to be executed.

SUMMARY OF THE INVENTION

It is a first object of the present invention to provide a method for determining a focusing control position capable of minimizing a focusing time required for determining a desired focusing control position in a recording/reproducing apparatus of an opto-magnetic disc.

It is a second object of the present invention to provide a method for determining a focusing control position in an opto-magnetic recording/reproducing apparatus capable of minimizing an amount of focusing control current applied to a focusing coil and a frequency of applying the focusing control current during a focusing operation of the opto-magnetic recording/reproducing apparatus to prevent a characteristic deterioration of the focusing coil in advance.

To achieve the first and second objects according to the present invention, there is provided a method for determining a focusing control position in an opto-magnetic disc recording/reproducing apparatus, in which a reproduction mode is selected by a user via a control display panel section, an internal counter of a control section is initialized, and a focusing control current applied to a focusing coil included in an optical pickup section is increased to raise the focusing control position of an objective lens. Successively, it is determined whether a first focusing detecting signal detected by a focusing servo section when a signal of quantity of light responding to either an inaccurate focusing control operation or an accurate focusing control operation is received into a light receiving device in the optical pickup section, and a first focus zero crossing signal detected in a focus zero crossing switch section corresponding to 'on' state of the focusing servo section are received or not, and a counting value of the counter is augmented by one when the first focusing detecting signal and first focus zero crossing signals are received.

Thereafter, the objective lens in the optical pickup section descends from a current position as much as a predetermined position when the counting value of the counter reaches a prescribed value to show a focusing state of the laser beam upon a reflective layer in the opto-magnetic disc, it is determined whether a second focusing detecting signal and a second focus zero crossing signal are received or not, and the focusing control operation is performed at the descending position of the objective lens when the second focusing detecting signal and second focus zero crossing signal are received.

Here, in the method for determining the focusing control position in the opto-magnetic disc recording/reproducing apparatus, when the focusing detecting signal and focus zero crossing signal are received into the control section as many as a prescribed times (e.g., twice) while the objective lens ascends to perform the control operation for determining the focusing control position, the ascending operation of the objective lens is no further performed at the current position, but the descending operation is performed to carry out the focusing control operation (i.e., 'on' operation of the focusing servo section) with respect to the reflective layer included in the opto-magnetic disc.

Therefore, the time required for determining the focusing control position is shortened as compared with the conventional system of searching it after allowing the objective lens to approach to the prescribed position of the protective layer included in the opto-magnetic disc. Accordingly, the focusing coil is prevented from being deteriorated by the supply of an excess focusing control current signal or the frequent supply of the focusing control current signal thereto.

BRIEF DESCRIPTION OF THE DRAWINGS

The above objects and other advantages of the present invention will become more apparent by describing in detail preferred embodiments thereof with reference to the attached drawings in which:

FIG. 3A is a waveform for illustrating characteristics of a focusing error signal;

FIG. 3B is a waveform for illustrating characteristics of a light signal receiving device output provided by a light receiving device;

FIG. 3C is a waveform for illustrating characteristics of a focusing detecting signal;

FIG. 3D is a waveform for illustrating characteristics of a focus zero crossing signal;

DESCRIPTION OF THE PREFERRED EMBODIMENT

A description will be given below in detail to a configuration and operation of a method for determining a focusing control operation position in an opto-magnetic disc recording/reproducing apparatus according to an embodiment of the present invention with reference to the accompanying drawings.

Figure 1:
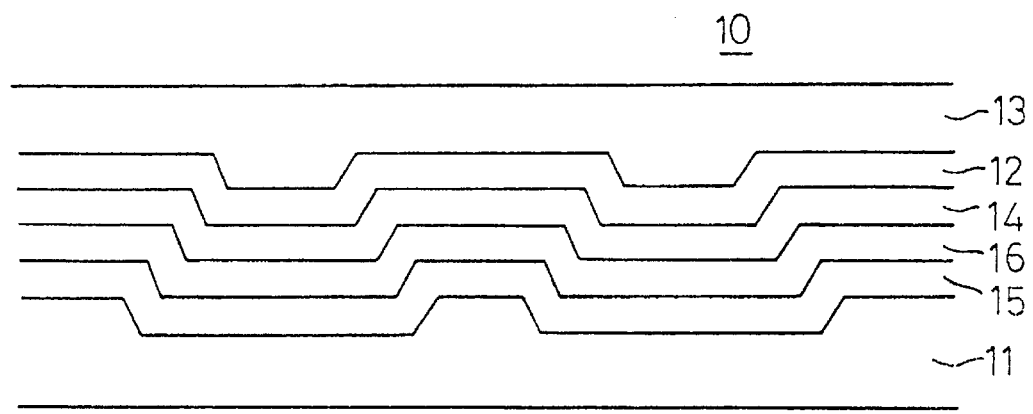
FIG. 1 is a sectional view for showing a sectional structure of a general opto-magnetic disc.
Figure 2A:
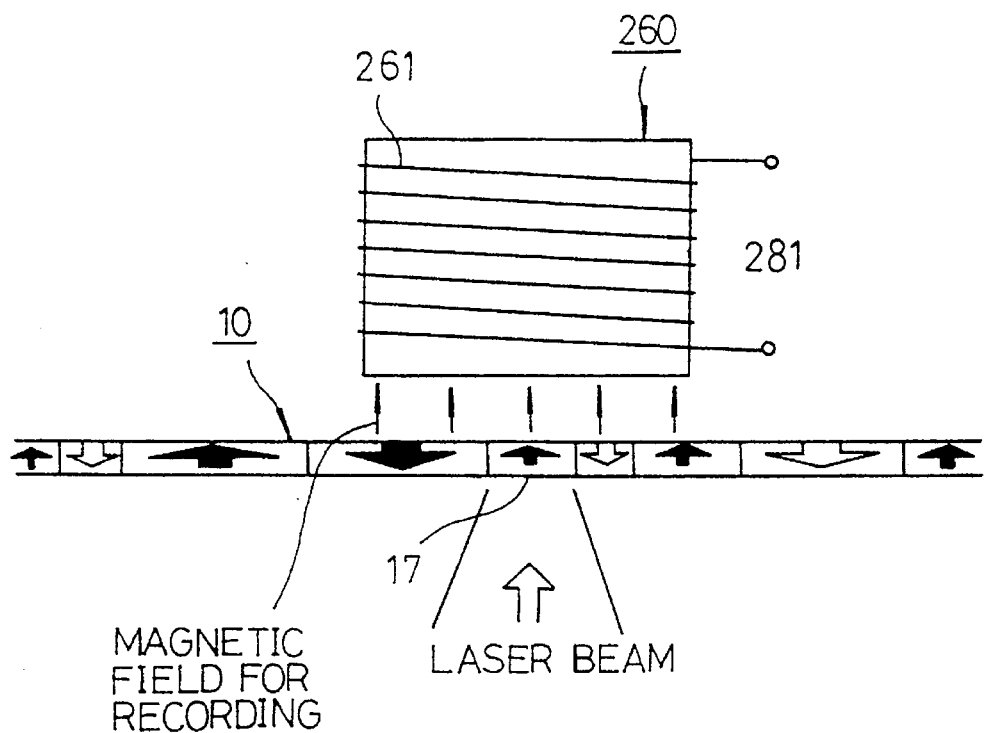
FIG. 2A is a schematic view for illustrating a recording operation in a recording/reproducing apparatus for the opto-magnetic disc as shown in FIG. 1.
Figure 2B:
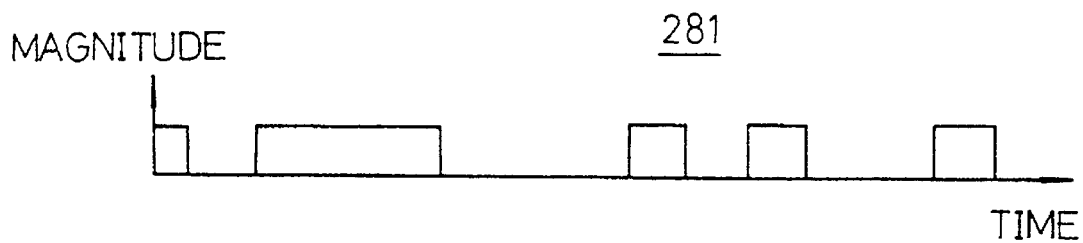
FIG. 2B is a waveform for representing characteristics of signal recording current applied to a magnetic head in order to record information on a recording surface of the opto-magnetic disc by means of the magnetic head shown in FIG. 2A.
Figure 4:
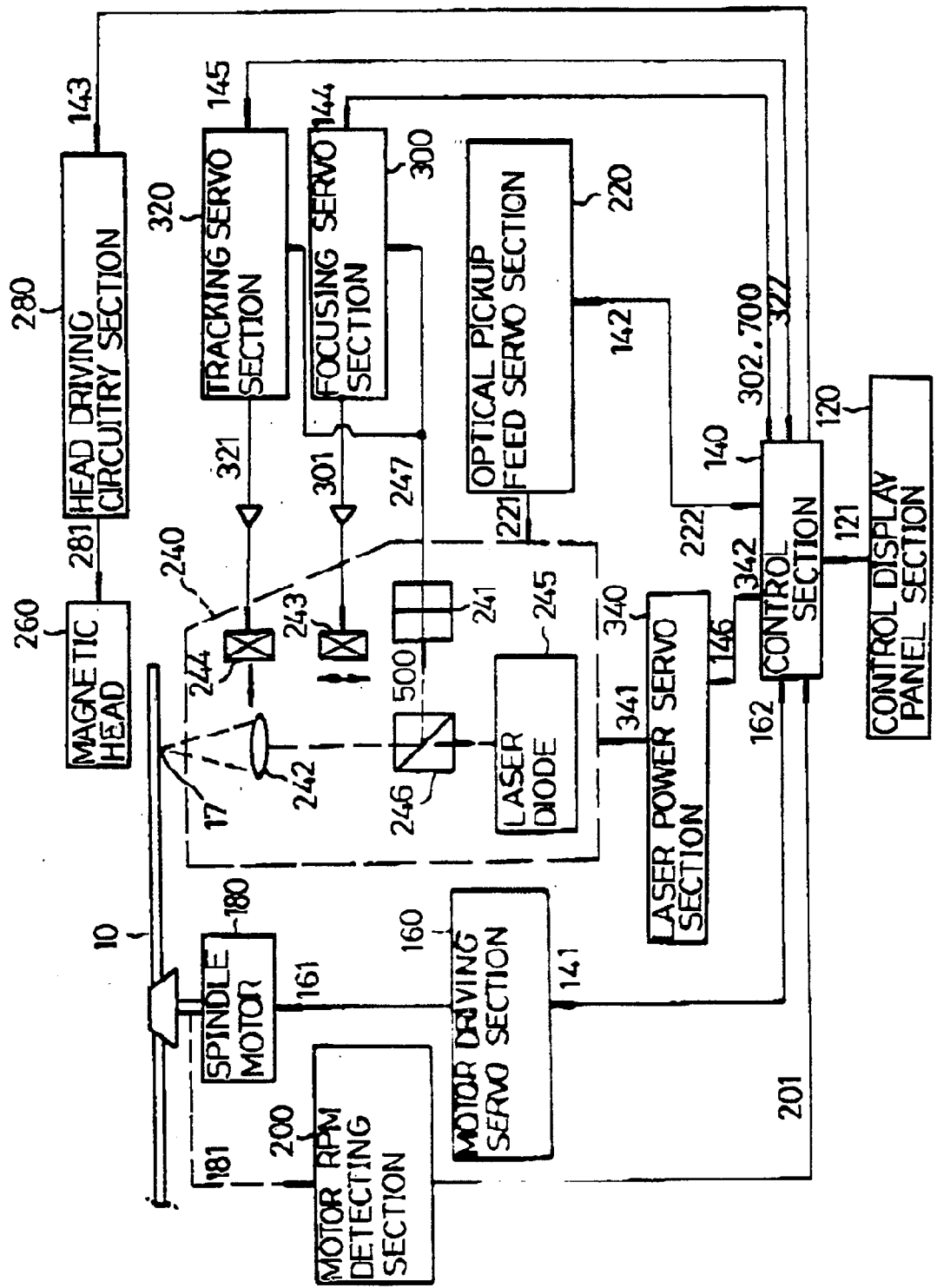
FIG. 4 is a block diagram for showing a servo system of a recording/reproducing apparatus for the opto-magnetic disc as shown in FIG. 1.

FIG. 4 is a block diagram for showing a servo system of a recording/reproducing apparatus for the opto-magnetic disc as shown in FIG. 1. As shown in FIG. 4, a configuration of an optical pickup section 240 is as follows. Laser beam emitted from a laser diode 245 reaches a beam splitter 246 via a grating lens (not shown). The laser beam reaching beam splitter 246 is incident to an opto-magnetic disc 10 via an objective lens 242 mounted to an objective lens holder (not shown). The laser beam incident to opto-magnetic disc 10 is repeatedly reflected to beam splitter 246 via objective lens 242. The reflective laser beam partly passes through beam splitter 246 and is detected by a light receiving device 241 (e.g., a photo diode). Light receiving device 241 provides a light receiving device output signal 247 (shown in FIG. 3B) in response to a signal of quantity of light 500 denoting the incident laser beam. Light receiving device output signal 247 is inputted to both a focusing servo section 300 and a tracking servo section 320 to execute operations in which a tracking error and/or a focusing error are corrected.

A control display panel section 120 includes a variety of buttons and display lamps for receiving operative instruction signals 121 responsive to functions manipulated by a user and displaying the functions under operation. A control section 140 supplies first, second, third, fourth, fifth and six control signals 141, 142, 143, 144, 145 and 146 to corresponding sections in response to operative instruction signals 121 provided by control display panel section 120 in order to perform a control operation. A motor driving servo section 160 inputs first control signal 141 provided by control section 140 and outputs a first motor driving servo signal 161 to a spindle electric motor 180 in order to control a rotational speed of spindle electric motor 180. Motor driving servo section 160 outputs a second motor driving servo signal 162 to control section 140. A motor rpm detecting section 200 detects rpm 181 of spindle electric motor 180 and outputs rpm detecting signal 201 to control section 140. An optical pickup feed servo section 220 inputs second control signal 142 provided by control section 140 and outputs a first feed servo signal 221 to optical pickup section 240, thereby executing focusing or tracking control operation of optical pickup section 240. Optical pickup feed servo section 220 outputs a second feed servo signal 222 to control section 140. A head driving circuitry section 280 inputs third control signal 143 provided by control section 140 and outputs a head driving signal 281 to magnetic head 260 for magnetizing an information recording surface of opto-magnetic disc 10.

Focusing servo section 300 inputs fourth control signal 144 provided by control section 140 and light receiving device output signal 247 provided by light receiving device 241 included in optical pickup section 240 in order to output focusing control current signal 301 to a focusing coil 243. By doing so, focusing servo section 300 moves objective lens 242 in a focusing operation direction (i.e., upward and downward directions) and corrects the focusing error. Tracking servo section 320 inputs light receiving device output signal 247 provided by light receiving device 241 and fifth control signal 145 provided by control section 140 in order to output tracking control current signal 321 to a tracking coil 244. Also, tracking servo section 320 outputs a tracking detecting signal 322. Accordingly, tracking servo section 320 moves objective lens 242 to a tracking operation direction (i.e., left and right directions) and corrects the tracking error. Focusing coil 243 and tracking coil 244 are respectively installed to outer surfaces of an objective lens holder (not shown) included in optical pickup section 240.

A laser power servo section 340 outputs a first laser power servo signal 341 to optical pickup section 240 and controls an output of the laser beam, to constant value, emitted from a laser diode 245 included in optical pickup section 240. Laser power servo section 340 outputs a second laser power servo signal 342 to control section 140.

Figure 5:
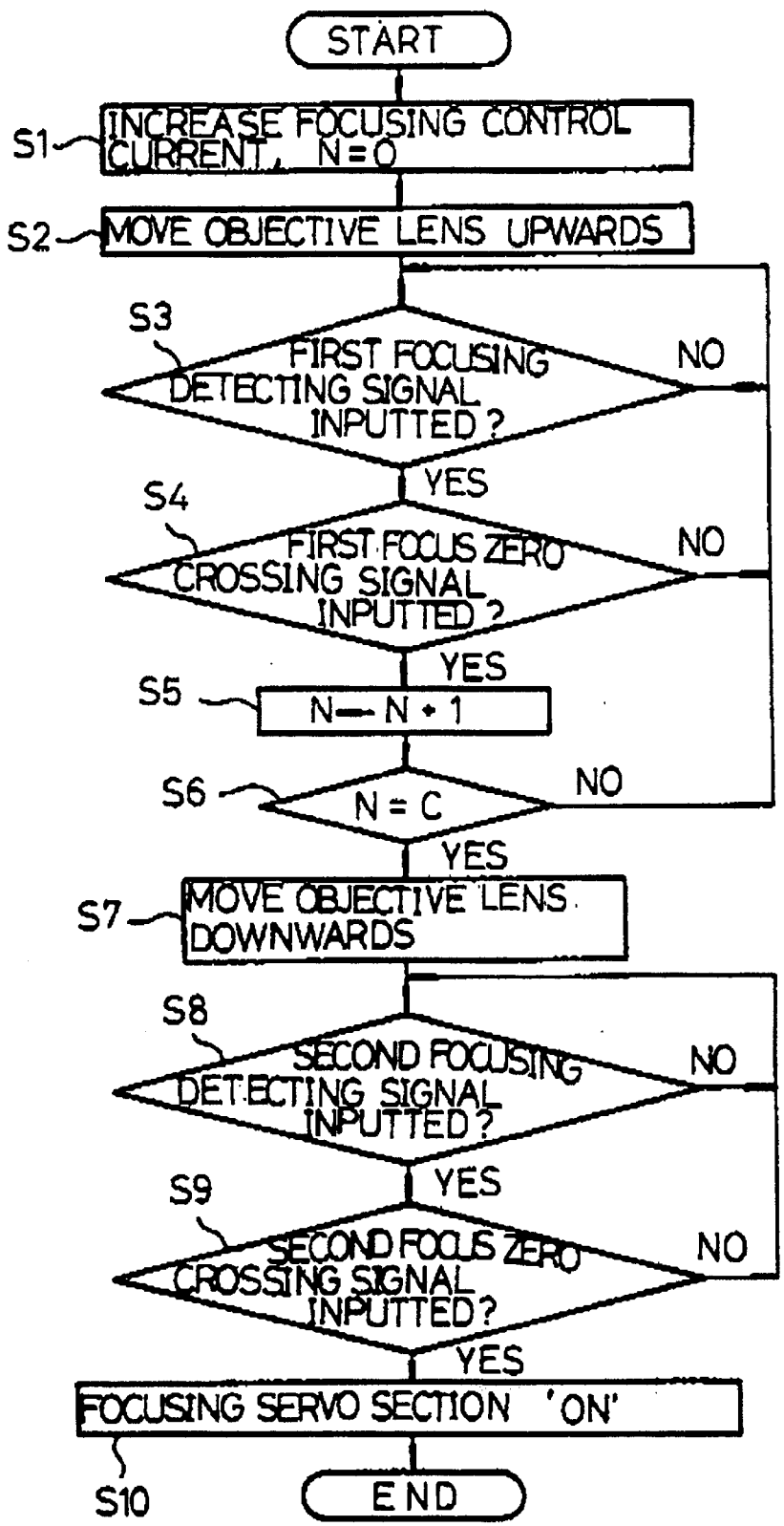
FIG. 5 is a flowchart for illustrating a method for determining a focusing control operation position in the opto-magnetic disc recording/reproducing apparatus as shown in FIG. 4.

The method for determining the focusing control operation position in the opto-magnetic disc recording/reproducing apparatus having the above-mentioned configuration, will be described as follows. FIG. 5 is a flowchart for illustrating a method for determining a focusing control operation position in the opto-magnetic disc recording/reproducing apparatus shown in FIG. 4. When a user turns on a power switch (not shown) and manipulates a mode selection switch (not shown) in order to select a playback mode, by means of manipulation of control display panel section 120 included in the opto-magnetic disc recording/reproducing apparatus, optical pickup section 240 is disposed on an initial position capable of reading out data from opto-magnetic disc 10 rotated by the driving of spindle electric motor 180, causing laser power servo section 340 to irradiate the predetermined laser beam onto opto-magnetic disc 10. At this time, in step S1, control section 140 clears a counting value N of an internal counter therein to zero, and controls focusing servo section 300 so as to increase the focusing control current applied to focusing coil 243. Accordingly, in step S2, objective lens 242 included in optical pickup section 240 ascends and heightens a focusing position of the laser beam. At this time, light receiving device 241 receives signal of quantity of light 500 which is portion of the incident laser beam via objective lens 242 and beam splitter 246 after being reflected from opto-magnetic disc 10. In step S3, control section 140 determines whether or not first focusing detecting signal 302A provided by focusing servo section 300 is received. If first focusing detecting signal 302A is not inputted, control section 140 repeatedly carries out the determining operation in step S3. If first focusing detecting signal 302A is inputted, control section 140 judges, in step S4, whether or not first focus zero crossing signal 700A (shown in FIG. 3D) detected by the focus zero crossing switch section is inputted.

When it is judged, in step S4, that first focus zero crossing signal 700A (shown in FIG. 3D) is not inputted, control section 140 returns to step S3 to judge whether or not succeeding first focusing detecting signal 302A is inputted. On the contrary, when first focus zero crossing signal 700A is inputted, control section 140 increase the counting value N of the counter by one, and judges, in step 6, whether or not the counting value N of the counter corresponds to the predetermined value C (e.g., two).

If it is judged, in step S6, that the counting value N of the counter does not correspond to the predetermined value, control section 140 returns to step S3 to repeatedly perform the succeeding control operation. On the other hand, when the counting value N of the counter corresponds to the predetermined value C, in step S7, control section 140 controls focusing servo section 300 to reduce the magnitude of focusing control current signal 301 applied to focusing coil 243, thereby descending objective lens 242 in the focusing operation direction by up to a predetermined position corresponding to the prescribed value of the counter in order to indicate a focusing state of the laser beam on reflective layer 12 of opto-magnetic disc 10. The reason the operation for descending objective lens 242 is executed, is that when the counting value N of the counter corresponds to the predetermined value C, the current position of objective lens is the initial position in which the focusing operation is executed, and that objective lens 242 is already positioned, to some extent, in a heightened position by a mechanical mechanism even though the ascending operation in the focusing direction of objective lens 242 is immediately stopped at the current position of objective lens 242. At this time, in step S8, control section 140 judges whether or not second focusing detecting signal 302B is inputted to control section 140.

If it is judged, in step S8, that second focusing detecting signal 302B is not inputted to control section 140, control section 140 returns to step S8 and judges whether or not succeeding second focusing detecting signal 302B is inputted to control section 140. On the other hand, if second focusing detecting signal 302B is inputted to control section 140, control section 140 judges, in step S9, whether or not second focus zero crossing signal 700B is inputted to control section 140.

If it is judged, in step S9, that second focus zero crossing signal 700B is not inputted to control section 140, control section 140 returns to step S8 and judges whether or not succeeding second focusing detecting signal 302B is inputted. On the other hand, if second focus zero crossing signal 700B is inputted to control section 140, control section 140 recognizes that the current position of objective lens 242 is adapted for focusing the laser beam on desired reflective layer 12 and executes the "ON" operation of focusing servo section 300 in step 10.

According to the present invention, when the first focusing detecting signal and first focus zero crossing signal are inputted as many as the predetermined number (e.g., twice) into the control section while the objective lens ascends to perform the control operation for determining the focusing control operation position, the ascending operation of the objective lens is not further carried out in the current position but the descending operation is performed, thereby executing the focusing control operation with respect to the reflective layer included in the opto-magnetic disc (i.e., the "ON" operation of the focusing servo section).

Consequently, the time required to determine the focusing control operation position is shortened over the conventional searching system in which the searching operation is executed after the objective lens is approached to the predetermined position of the protective layer included in the opto-magnetic disc. This advantage in turn improves a drawback that the characteristics of the focusing coil are deteriorated due to the application of the excess focusing control current signal or frequent application of the focusing control current signal to the focusing coil.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for determining a focusing control position in an opto-magnetic disc recording/reproducing apparatus, the method comprising the steps of:

initializing an internal counter of a control section, and increasing a focusing control current applied to a focusing coil included in an optical pickup section to raise a focusing control position of an objective lens during a reproduction mode;

determining whether both a first focusing detecting signal detected by a focusing servo section upon receiving a signal of quantity of light generated by a light receiving device in the optical pickup section in response to either an inaccurate focusing control operation or an accurate focusing control operation, and a first focus zero crossing signal detected in a focus zero crossing switch section corresponding to on state of the focusing servo section are received or not, and augmenting a counting value of the counter by one when both the first focusing detecting signal and the first focus zero crossing signal are received; and descendinng the objective lens in the optical pickup section from a current position by up to a predetermined position corresponding to a prescribed value of the counter when the counting value of the counter reaches the prescribed value to indicate a focusing state of the laser beam on a reflective layer in the opto-magnetic disc, determining inputs of a second focusing detecting signal and a second focus zero crossing signal, and executing the focusing control operation at a descended position of the objective lens when both the second focusing detecting signal and the second focus zero crossing signal are received.

2. A method for determining a focusing control position in an opto-magnetic disc recording/reproducing apparatus as claimed in claim 1, wherein the initialized counter has a value of zero, and the prescribed value is two.

3. A method for determining a focusing control position in an opto-magnetic disc recording/reproducing apparatus as claimed in claim 1, wherein whether the first focusing detecting signal is inputted into the control section is firstly determined and then whether the first focus zero crossing signal is inputted into the control section is determined.

4. A method for determining a focusing control position in an opto-magnetic disc recording/reproducing apparatus as claimed in claim 1, wherein whether the second focusing detecting signal is inputted into the control section is firstly determined and then whether the second focus zero crossing signal is inputted into the control section is determined.

5. A method for determining a focusing control position in an opto-magnetic disc recording/reproducing apparatus as claimed in claim 1, wherein when the first focusing detecting signal is not inputted, the control section repeats the detecting operation until the first focusing detecting signal is received.

6. A method for determining a focusing control position in an opto-magnetic disc recording/reproducing apparatus as claimed in claim 1, wherein when the first focus zero crossing signal is not inputted, the control section repeats the detecting operation until the first focus zero crossing signal is received.

7. A method for determining a focusing control position in an opto-magnetic disc recording/reproducing apparatus as claimed in claim 1, wherein when the second focusing detecting signal is not inputted, the control section repeats the detecting operation until the second focusing detecting signal is received.

8. A method for determining a focusing control position in an opto-magnetic disc recording/reproducing apparatus as claimed in claim 1, wherein when the second focus zero crossing signal is not inputted, the control section repeats the detecting operation until the second focus zero crossing signal is received.

9. A method for determining a focusing control position in an opto-magnetic disc recording/reproducing apparatus as claimed in claim 1, wherein when the counting value of the counter does not reach the prescribed value, the first focusing detecting signal and first focus zero crossing signal are repeatedly detected to augment the value of the counter by one.

10. A method for determining a focusing control position in an opto-magnetic disc recording/reproducing apparatus, the method comprising the steps of:

initializing an internal counter of a control section, and increasing a focusing control current applied to a focusing coil included in an optical pickup section to raise a focusing control position of an objective lens during a reproduction mode;

determining whether a first focusing detecting signal detected by a focusing servo section is inputted into the control section initially and then whether a first focus zero crossing signal detected by a focus zero crossing switch section is inputted into the control section, augmenting a counting value of the counter by one when both the first focusing detecting signal and the first focus zero crossing signal are received, and determining whether or not the counting value of the counter reaches the prescribed value when the first focusing detecting signal and the first focus zero crossing signal are repeatedly detected; and descending the objective lens in the optical pickup section from a current position by up to a predetermined position corresponding to the prescribed value of the counter when the counting value of the counter reaches the prescribed value to indicate a focusing state of the laser beam on a reflective layer in the opto-magnetic disc, determining whether a second focusing detecting signal detected by the focusing servo section is inputted into the control section initially and then whether a second focus zero crossing signal detected by the focus zero crossing switch section is inputted into the control section, and executing the focusing control operation at a descended position of the objective lens when both the second focusing detecting signal and the second focus zero crossing signal are received.

11. A method for determining a focusing control position in an opto-magnetic disc recording/reproducing apparatus as claimed in claim 10, wherein the initialized counter has a value of zero and the prescribed value is two.

12. A method for determining a focusing control position in an opto-magnetic disc recording/reproducing apparatus as claimed in claim 10, wherein when the first focusing detecting signal is not inputted, the control section repeats the detecting operation until the first focusing detecting signal is received.

13. A method for determining a focusing control position in an opto-magnetic disc recording/reproducing apparatus as claimed in claim 10, wherein when the first focus zero crossing signal is not inputted, the control section repeats the detecting operation until the first focus zero crossing signal is received.

14. A method for determining a focusing control position in an opto-magnetic disc recording/reproducing apparatus as claimed in claim 10, wherein when the second focusing detecting signal is not inputted, the control section repeats the detecting operation until the second focusing detecting signal is received.

15. A method for determining a focusing control position in an opto-magnetic disc recording/reproducing apparatus as claimed in claim 10, wherein when the second focus zero crossing signal is not inputted, the control section repeats the detecting operation until the second focus zero crossing signal is received.

* * * * *